US012690053B2

(12) United States Patent　　　　　(10) Patent No.:　US 12,690,053 B2

Song et al.　　　　　　　　　　　　　(45) Date of Patent:　　Jul. 21, 2026

(54) APPARATUS AND METHOD FOR CONTROL OF E2 NODE IN WIRELESS COMMUNICATION SYSTEM

(71) Applicant: Samsung Electronics Co., Ltd., Suwon-si (KR)

(72) Inventors: Junhyuk Song, Suwon-si (KR); Jaeyun Ko, Suwon-si (KR); Chungkeun Lee, Suwon-si (KR); Sangkyou Ryou, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 18/312,278

(22) Filed: May 4, 2023

(65) Prior Publication Data

US 2023/0276465 A1　　Aug. 31, 2023

Related U.S. Application Data

(63) Continuation of application No. PCT/KR2021/016075, filed on Nov. 5, 2021.

(30) Foreign Application Priority Data

Nov. 5, 2020　(KR) ........................ 10-2020-0147203

(51) Int. Cl.
　H04W 72/29　　　(2023.01)
　H04W 72/232　　(2023.01)
　　　　(Continued)

(52) U.S. Cl.
　CPC ......... H04W 72/29 (2023.01); H04W 72/232 (2023.01); H04W 72/566 (2023.01); H04W 92/12 (2013.01)

(58) Field of Classification Search
　CPC . H04W 72/29; H04W 72/232; H04W 72/566; H04W 92/12; H04W 28/08;
　　　　　　　　　(Continued)

(56) References Cited

U.S. PATENT DOCUMENTS

| | | | |
|---|---|---|---|
| 10,530,558 B2 | 1/2020 | Zhu et al. | |
| 10,536,386 B2 | 1/2020 | Maaref et al. | |

(Continued)

FOREIGN PATENT DOCUMENTS

| | | |
|---|---|---|
| CN | 111242304 A | 6/2020 |
| CN | 111510959 A | 8/2020 |

(Continued)

OTHER PUBLICATIONS

O-RAN.WG3.E2AP-v01.01, O-RAN Working Group 3, Near-Real-time RA, N Intelligent Controller, E2 Application Proto, col (E2AP), Jul. 15, 2020.

(Continued)

*Primary Examiner* — Jay P Patel

(74) *Attorney, Agent, or Firm* — Jefferson IP Law, LLP

(57) ABSTRACT

The disclosure relates to a 5$^{th}$ generation (5G) or pre-5G communication system for supporting a higher data transmission rate than a 4$^{th}$ generation (4G) communication system such as long term evolution (LTE). A method performed by a near-real time (RT) radio access network (RAN) intelligent controller (RIC) is provided. The method includes the steps of generating an RIC control message, and transmitting the RIC control message to an E2 node, wherein the RIC control message includes an information element (IE) for indicating a radio resource control (RRC) message type.

17 Claims, 15 Drawing Sheets

(51) Int. Cl.
*H04W 72/566* (2023.01)
*H04W 92/12* (2009.01)

(58) Field of Classification Search
CPC ......... H04W 28/0975; H04W 28/0865; H04W 88/12; H04W 28/0846; H04W 28/0862; H04W 88/085; H04W 92/20; H04W 92/24
See application file for complete search history.

(56) References Cited

U.S. PATENT DOCUMENTS

| | | | |
|---|---|---|---|
| 11,419,009 B2 | 8/2022 | Kainulainen et al. | |
| 2002/0181436 A1 | 12/2002 | Mueckenheim et al. | |
| 2005/0232204 A1 | 10/2005 | Bass et al. | |
| 2010/0002632 A1 | 1/2010 | Park et al. | |
| 2013/0122918 A1* | 5/2013 | Boley | H04W 76/27 |
| | | | 455/450 |
| 2020/0314719 A1 | 10/2020 | Tofighbakhsh et al. | |
| 2020/0314826 A1 | 10/2020 | Sharma et al. | |
| 2020/0329381 A1 | 10/2020 | Chou et al. | |
| 2020/0351935 A1 | 11/2020 | Chapman et al. | |
| 2022/0038893 A1* | 2/2022 | Narasimha | H04L 63/166 |
| 2022/0046433 A1 | 2/2022 | Bedekar et al. | |
| 2022/0210681 A1* | 6/2022 | Thangarasa | H04W 56/001 |
| 2023/0199539 A1* | 6/2023 | Lee | H04W 24/08 |
| | | | 455/422.1 |
| 2023/0209370 A1* | 6/2023 | Pateromichelakis | G06N 20/00 |
| | | | 370/328 |
| 2023/0246724 A1* | 8/2023 | Pateromichelakis | H04J 11/005 |
| | | | 370/329 |
| 2023/0337043 A1* | 10/2023 | Pateromichelakis | |
| | | | H04W 28/0263 |

FOREIGN PATENT DOCUMENTS

| | | |
|---|---|---|
| CN | 111565418 A | 8/2020 |
| CN | 111642011 A | 9/2020 |
| CN | 111835548 A | 10/2020 |
| KR | 10-2000-0024275 A | 5/2000 |
| KR | 10-2002-0024330 A | 3/2002 |
| KR | 10-2002-0077817 A | 10/2002 |
| KR | 10-2004-0013968 A | 2/2004 |
| KR | 10-2007-0020740 A | 2/2007 |
| KR | 10-2008-0022283 A | 3/2008 |
| KR | 10-2008-0050222 A | 6/2008 |
| KR | 10-2008-0051407 A | 6/2008 |
| KR | 10-2014-0124571 A | 10/2014 |
| KR | 10-2014-0134677 A | 11/2014 |
| KR | 10-2016-0124523 A | 10/2016 |
| KR | 10-2017-0005478 A | 1/2017 |
| WO | 2019/158699 A1 | 8/2019 |
| WO | 2020/131128 A1 | 6/2020 |
| WO | 2020/223668 A1 | 11/2020 |

OTHER PUBLICATIONS

O-RAN Towards an Open and Smart RAN, Nov. 7, 2019.
Extended European Search Report dated Jan. 16, 2024, issued in European Patent Application No. 21889639.7.
'O-RAN Working Group 3, Near-Real-time RAN Intelligent Controller, E2 Application Protocol (E2AP)', O-RAN.WG3. E2AP-v01. 01, Jul. 15, 2020.
'O-RAN Working Group 3, Near-Real-time RAN Intelligent Controller Architecture & E2 General Aspects and Principles', O-RAN. WG3.E2GAP-v01.01, Jul. 15, 2020.
International Search Report dated Feb. 25, 2022, issued in International Patent Application No. PCT/KR2021/016075.
O-RAN Alliance; LS on O-RAN Alliance & 3GPP Coordination on O-RAN Alliance Outputs; 3GPP TSG-SA3 Meeting #97; S3-193932; Reno, US; Nov. 18-22, 2019.
Vivo; QoS management for sidelink; 3GPP TSG RAN WG1 Meeting #99; R1-1912027; Reno, US; Nov. 18-22, 2019.
Kaltenberger et al.; OpenAirInterface: Democratizing innovation in the 5G Era; ScienceDirect; Computer Networks 176 (2020) 107284; www.elsevier.com/locate/comnet; May 1, 2020.
Korean Office Action with English translation dated Sep. 8, 2025; Korean Appln. No. 10-2020-0147203.
European Communication pursuant to Article 94(3) EPC dated Sep. 16, 2025; European Appln. No. 21 889 639.7-1206.

* cited by examiner

1100

| IE/Group Name | Presence | Range | IE type and reference | Semantics description |
|---|---|---|---|---|
| Radio Control Interface Message Type | M | | | |
| RAT type | M | | | |
| O-RAN UE ID | O | | | |
| DRB ID | O | | | |
| Radio Control Paramter | O | | | |
| > DL scheduling priority | O | 1..65535 | Relative scheduling priority for non-GBR bearer per UE | |
| > UL scheduling priority | O | 1..65535 | Relative scheduling priority for non-GBR bearer per UE | |
| > DL target BLER | O | 1~100% 0.1% 0.01% 0.001% 0.0001% 0.00001% 0.000001% | Target BLER for MCS control per UE | |
| > UL target BLER | O | 1~100% 0.1% 0.01% 0.001% 0.0001% 0.00001% 0.000001% | Target BLER for MCS control per UE | |
| > DL maximum allocable Radio Block | O | 0..273 | # of maximum allocable radio block per UE or per DRB per UE (if DRB ID exists) | |
| > UL maximum allocable Radio Block | O | 0..273 | # of maximum allocable radio block per UE | |
| > DL Guaranteed Radio Block | O | 0..273 | # of guaranteed radio block per UE or per DRB per UE (if DRB ID exists) | |
| > UL Guaranteed Radio Block | O | 0..273 | # of guaranteed radio block per UE or per DRB per UE (if DRB ID exists) | |
| > DL Guaranteed Data Rate | O | 0..1000000000 bps | Guaranteed Data Rate rate per UE or per DRB per UE (If DRB ID exists) | |
| > UL Guaranteed Data Rate | O | 0..1000000000 bps | Guaranteed Data Rate rate per UE or per DRB per UE (If DRB ID exists) | |
| > DL power offset | O | -30 ~ +30 | DL power offset for power control (in dB) per UE | |
| > UL power offset | O | -30 ~ +30 | DL power offset for power control (in dB) per UE | |
| Per UE DCI control message container | O | | | |
| > DCI type for LTE | O | Format 0, Format 1, Format 1A, Format 1B, Format 1C, Format 1D, Format 2, Format 2A, Format 2B, Format 2C, Format 2D, Format 3, Format 3A, Format 4, Format 5, . . . | DCI message format type defined in TS 36.212 | |
| > DCI type for NR | O | Format 0_0, Format 0_1, Format 0_2, Format 1_0, Format 1_1, Format 1_2, Format 2_0, Format 2_1, Format 2_2, Format 2_3, Format 2_4, Format 2_6, Format 3_0, Format 3_1, . . . | DCI message format type defined in TS 38.212 | |
| > DCI Container | O | | Message container | |

FIG.13

APPARATUS AND METHOD FOR CONTROL OF E2 NODE IN WIRELESS COMMUNICATION SYSTEM

CROSS-REFERENCE TO RELATED APPLICATION(S)

This application is a continuation application, claiming priority under § 365(c), of an International application No. PCT/KR2021/016075, filed on Nov. 5, 2021, which is based on and claims the benefit of a Korean patent application number 10-2020-0147203, filed on Nov. 5, 2020, in the Korean Intellectual Property Office, the disclosure of which is incorporated by reference herein in its entirety.

BACKGROUND

1. Field

The disclosure relates to a method and apparatus for controlling an E2 node by a radio access network (RAN) intelligent controller (RIC) in a radio access network. More particularly, the disclosure relates to a method and apparatus for controlling an E2 node via an E2 message according to an open radio access network (O-RAN) standard of a wireless communication system.

2. Description of Related Art

To meet the demand for wireless data traffic having increased since deployment of 4$^{th}$ generation (4G) communication systems, efforts have been made to develop an improved 5$^{th}$ generation (5G) or a pre-5G communication system. The 5G or pre-5G communication system is also called a 'Beyond 4G Network' or a 'Post long term evolution (LTE) System'.

The 5G communication system is considered to be implemented in higher frequency (millimeter wave (mmWave)) bands, e.g., 28 GHz or 60 gigahertz (GHz) bands, so as to accomplish higher data rates. To decrease propagation loss of radio waves and increase transmission distance, beam-forming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, coop-erative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To satisfy demands for wireless data traffic, a 5G system, for example, new radio or next radio (NR), has been commercialized and has been providing a service of a high data transmission rate via the 5G system as with the 4G system. Additionally, wireless communication services for various purposes, such as Internet of things, a service that requires high reliability for a specific purpose, and the like, may be expected to be provided. Based on the existing 3$^{rd}$ generation partnership project (3GPP) standard, the open radio access network (O-RAN), which operators and equipment providers have established together, defines a new network element (NE) and interface standard in a system mixedly used with the 4G communication system and the 5G system, and suggests an O-RAN structure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for controlling an E2 node by a radio access network (RAN) intelligent controller (RIC) in a wireless communication system.

Another aspect of the disclosure is to provide a method and apparatus for configuring a predetermined mode for an E2 node by an RIC so that the E2 node operates according to control performed by the RIC.

Additional aspects will be set forth in part in the description which follows and, in part, will be apparent from the description, or may be learned by practice of the presented embodiments.

In accordance with an aspect of the disclosure, a method performed by a Near-real time (RT) radio access network (RAN) intelligent controller (RIC) is provided. The method includes an operation of producing an RIC control message, and an operation of transmitting the RIC control message to an E2 node, and the RIC control message includes an information element (IE) for indicating a type of radio resource control (RRC) message.

In accordance with another aspect of the disclosure, a method performed by an E2 node is provided. The method includes an operation of receiving a radio access network (RAN) intelligent controller (RIC) control message from a Near-real time (RT) RIC, and an operation of applying one or more parameters included in the RIC control message, and the RIC control message includes an information element (IE) indicating a type of radio resource control (RRC) message.

In accordance with another aspect of the disclosure, an apparatus of a Near-real time (RT) radio access network (RAN) intelligent controller (RIC) is provided. The apparatus includes at least one transceiver and at least one processor, the at least one processor may be configured to produce an RIC control message and to transmit the RIC control message to an E2 node, and the RIC control message includes an information element (IE) for indicating a type of radio resource control (RRC) message.

In accordance with another aspect of the disclosure, an apparatus of an E2 node is provided. The apparatus includes at least one transceiver and at least one processor, the at least one processor is configured to receive a radio access network (RAN) intelligent controller (RIC) control message from a Near-real time (RT) RIC and to apply one or more parameters included in the RIC control message, and the RIC control message includes an information element (IE) indicating a type of radio resource control (RRC) message.

In accordance with another aspect of the disclosure, a method performed by an E2 node, a method performed by a radio access network (RAN) intelligent controller (RIC) is provided. The method includes an operation of receiving a configuration message from an E2 node, an operation of producing a control message based on the configuration message, and an operation of transmitting the control message to the E2 node, and the control message includes a message to be transferred from the E2 node to another E2 node.

A method and apparatus according to various embodiments of the disclosure may enable a radio access network (RAN) intelligent controller (RIC) to control an E2 node.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram illustrating an example of transferring scheduling information via an E2 control message according to an embodiment of the disclosure.

The same reference numerals are used to represent the same elements throughout the drawings.

DETAILED DESCRIPTION

Figure 1:
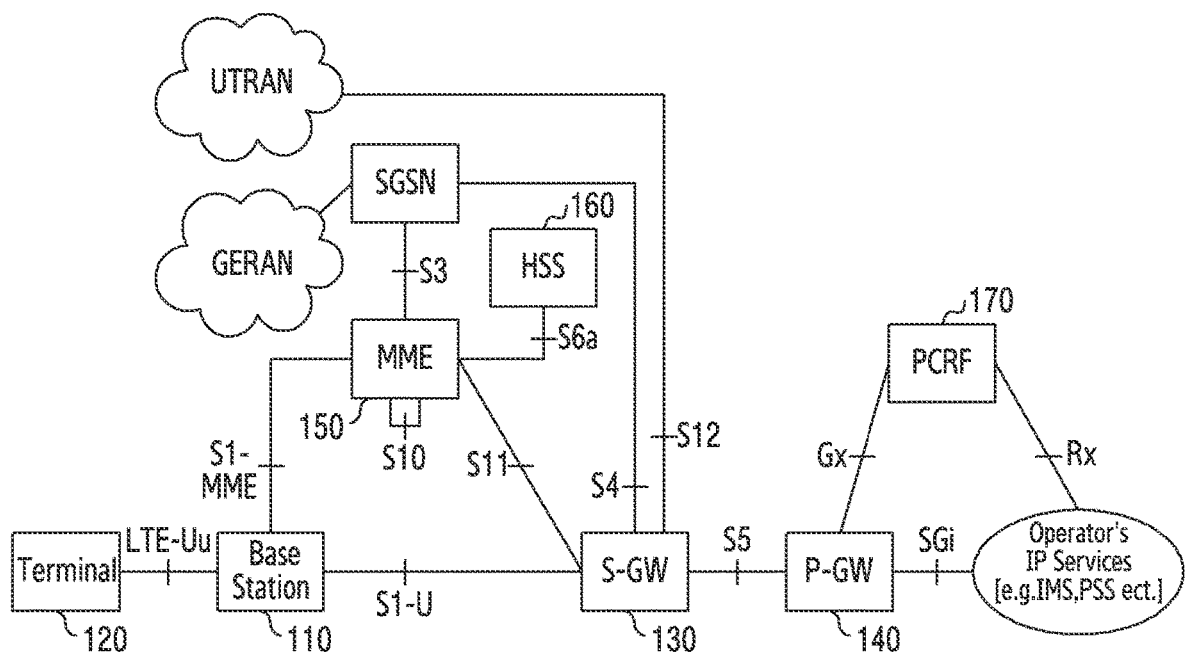
FIG. 1 is a diagram illustrating an example of a 4$^{th}$ generation (4G) long-term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the disclosure will be described based on an approach of hardware. However, various embodiments of the disclosure include a technology that uses both hardware and software, and thus the various embodiments of the disclosure may not exclude the perspective of software.

The disclosure relates to a method and apparatus for performing a subscription procedure between a device in a radio access network (RAN) and a device for controlling the RAN in a wireless communication system. In an embodiment, the disclosure relates to a method and apparatus for measuring performance for each user equipment (UE) in an E2 interface and resource management for each slice of a base station in a radio access network. In another embodiment, the disclosure relates to a method and apparatus for transferring a container-based measurement message when a service event occurs in association with a base station that complies with an open radio access network (O-RAN) standard using an E2 message of a wireless communication system.

Terms that refer to signals, terms that refer to channels, terms that refer to control information, terms that refer to network entities, terms that refer to component elements of an apparatus, and the like are provided for ease of description. Accordingly, the disclosure is not limited to the following terms and other terms having the same technical meaning may be used.

In the disclosure, the expression, 'greater than' or 'less than' may be used in order to determine whether a predetermined condition is satisfied or fulfilled. The expressions are merely used to express an example but do not exclude the expressions 'greater than or equal to' or 'less than or equal to'. A condition including the expression 'greater than or equal to' may be replaced with a condition including the expression 'greater than', a condition including the expression 'less than or equal to' may be replaced with a condition including the expression 'less than', and a condition including the expression 'greater than or equal to and less than' may be replaced with a condition including the expression 'greater than and less than or equal to'.

Although the disclosure describes various embodiments using terms defined in some communication standards (e.g., 3rd generation partnership project (3GPP), open radio access network (O-RAN)), the embodiments are merely examples for description. Various embodiments of the disclosure may be easily modified and applied to other communication systems.

As the 4th generation (4G)/5th generation (5G) communication system (e.g., new radio (NR)) has been commercialized, supporting differentiated services to users has been required in a virtualized network. The 3GPP is a joint research project of mobile communication-related groups and works for the purpose of writing the 3rd generation (3G) mobile communication system standard, which is globally applicable, within the scope of the IMT-2000 project of the international telecommunications union (ITU). The 3GPP was established in December 1998, and the 3GPP standard is based on an enhanced GSM standard and includes radio and core networks and a service architecture in the range of standardization. Accordingly, the open radio access network (O-RAN) may newly define a radio unit (RU), a digital unit (DU), a central unit-control plane (CU-CP), and a CU-user plane (CU-UP), which are nodes configured as a base station and a 3GPP network entity (3GPP NE), as an O-RAN(O)-RU, an O-DU, an O-CU-CP, and an O-CU-UP, respectively, and may additionally standardize a near-real-time (NRT) radio access network intelligent controller (RIC). The disclosure is to support an operator specific service model in an E2 interface in which an RIC requests a service from an O-DU, an O-CU-CP, or an O-CU-UP. The O-RU, O-DU, O-CU-CP, O-CU-UP may be understood as objects operable according to the O-RAN standard, included in an RAN, and referred to as E2 nodes. Interfaces between an RIC and E2 nodes that are objects operable according to the O-RAN standard and included in the RAN may use an application protocol (E2AP).

In an embodiment, the RIC may be a logical node that may collect information associated with a cell site in which a UE and an O-DU, O-CU-CP, or O-CU-UP perform transmission or reception. In another embodiment, the RIC may be embodied in the form of servers intensively disposed in a single physical place. Connection between the O-DU and the RIC, between the O-CU-CP and the RIC, and between O-CU-UP and the RIC may be established via Ethernet. To this end, there is a desire for the standard of an interface for communication between the O-DU and the RIC, between the O-CU-CP and the RIC, and between the O-CU-UP and the RIC. A message standard such as E2-DU, E2-CU-CP, E2-CU-CP, and the like and procedures between the RIC and each of the O-DU, the O-CU-CP, O-CU-UP may need to be defined. Supporting differentiated services to users may be required in a virtualized network, and functions of messages of the E2-DU, E2-CU-CP, and E2-CU-UP for supporting a service with respect to a broad cell coverage area by concentrating, in the RIC, a message/function of processing a call produced in the O-RAN may need to be defined.

In yet another embodiment, the RIC may perform communication with the O-CU, O-CU-CP, and O-CU-UP using an E2 interface, and may configure a condition for producing an event by producing and transmitting a subscription message. The RIC may, for example, produce and transfer an E2 subscription request (subscription Request) message to an E2 node (e.g., the O-CU-CP, O-CU-UP, and O-DU), so as to configure a call processing event. After configuring the event, the E2 node may transfer a subscription request response message to the RIC.

The E2 node may, for example, transmit a current state to the RIC via an E2 indication/report. In an embodiment, the RIC may control the O-DU, O-CU-CP, and O-CU-UP by using an E2 control message. Some embodiments of the disclosure may suggest an E2 indication message including measurement information for each UE, and transmitted from an O-DU at intervals configured in a condition for a subscription event. Additionally, various embodiments of the disclosure may suggest a message transmitted from the RIC to the O-DU for controlling a resource.

FIG. 1 is a diagram illustrating an example of a 4th generation (4G) long-term evolution (LTE) core system according to an embodiment of the disclosure.

Referring to FIG. 1, an LTE core system may include a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

A base station 110 may be a network infrastructure that enables a terminal 120 to perform radio access. The base station 110 may, for example, be a device that collects state information such as a buffer state, available transmission power, a channel state, and the like, and performs scheduling. In an embodiment, the base station 110 may have, as a coverage area, a predetermined geographical area defined based on the distance in which the base station 110 is capable of delivering a signal. The base station 110 may be connected to an MME 150 via an S1-MME interface. In another embodiment, the base station 110 may be referred to as an access point (AP), an eNodeB (eNB), a wireless point, a transmission/reception point (TRP), or other terms having technical meanings equivalent thereto, in addition to a base station.

In an embodiment, the terminal 120 may be a device used by a user, and may perform communication with the base station 110 via a wireless channel. Depending on the case, the terminal 120 may be operated without user involvement. At least one of the terminals 120 and 130 is a device that performs machine type communication (MTC), and may not be carried by a user. In another embodiment, the terminal 120 may be referred to as a 'user equipment (UE)', 'mobile station', 'subscriber station', 'customer-premises equipment (CPE)', 'remote terminal', 'wireless terminal', 'user device', or other terms having technical meanings equivalent thereto, in addition a terminal.

In an embodiment, the S-GW 130 may provide a data bearer, and may produce or control a data bearer according to control performed by the MME 150. The S-GW 130 may, for example, process a packet received from the base station 110 or a packet to be forwarded to the base station 110. In another embodiment, the S-GW 130 may act as an anchor (anchoring) when the terminal 120 performs handover between base stations. In yet another embodiment, the P-GW 140 may function as a point of connection with an external network (e.g., an Internet network). In addition, the P-GW 140 may allocate an Internet protocol (IP) address to the terminal 120, and may function as an anchor for the S-GW 130. In addition, the P-GW 140 may apply a quality of service (QoS) policy of the terminal 120, and may manage charging data (account data).

In an embodiment, the MME 150 may manage mobility of the terminal 120. In addition, the MME 150 may perform authentication of the terminal 120, management of a bearer, and the like. In an example, the MME 150 may be in charge of mobility management and various control functions with respect to a terminal. The MME 150 may interoperate with a serving GPRS support node (SGSN).

The HSS 160 may store key information and a subscriber profile for authentication of the terminal 120. According to another embodiment, the key information and subscriber profile may be transferred from the HSS 160 to the MME 150 when the terminal 120 accesses a network.

According to one embodiment, the PCRF 170 may define a policy and a rule for charging. According to another embodiment, stored information may be transferred from the PCRF 170 to the P-GW 140, and the P-GW 140 may perform control (e.g., QoS management, charging, and the like) with respect to the terminal 120 based on the information provided from the PCRF 170.

According to yet another embodiment, carrier aggregation (CA) technology is technology that combines a plurality of component carriers and enables a single UE to transmit or receive a signal by simultaneously using such a plurality of component carriers, thereby increasing efficiency of use of frequency from the perspective of a UE or a base station. Specifically, according to the CA technology, a UE and a base station may transmit or receive a signal in a broadband by using each of the plurality of component elements in an uplink (UL) and a downlink (DL). The component carriers may be located in different frequency bands. An uplink is a communication link in which a UE transmits a signal to a base station. A downlink is a communication link in which a base station transmits a signal to a UE. In this instance, the number of uplink component carriers and the number of downlink component carriers may be different from each other.

According to still another embodiment, dual connectivity or multi connectivity is technology in which a single UE is connected to a plurality of different base stations and performs signal transmission or reception by using each of the carriers of the plurality of base stations located in different frequency bands, in parallel, thereby increasing efficiency of use of frequency from the perspective of a UE or a base station. In an embodiment, the UE may be connected to both a first base station (e.g., a base station that provides a service using LTE technology or 4G mobile communication technology) and a second base station (e.g., a base station that provides a service using new radio (NR) technology or 5$^{th}$ generation (5G) mobile communication technology), and may perform traffic transmission or reception. Frequency resources used by respective base stations may be located in different bands. As described above, a scheme that operates based on dual connectivity of LTE and NR is referred to as 5G non-standalone (5G NSA).

Figure 2A:
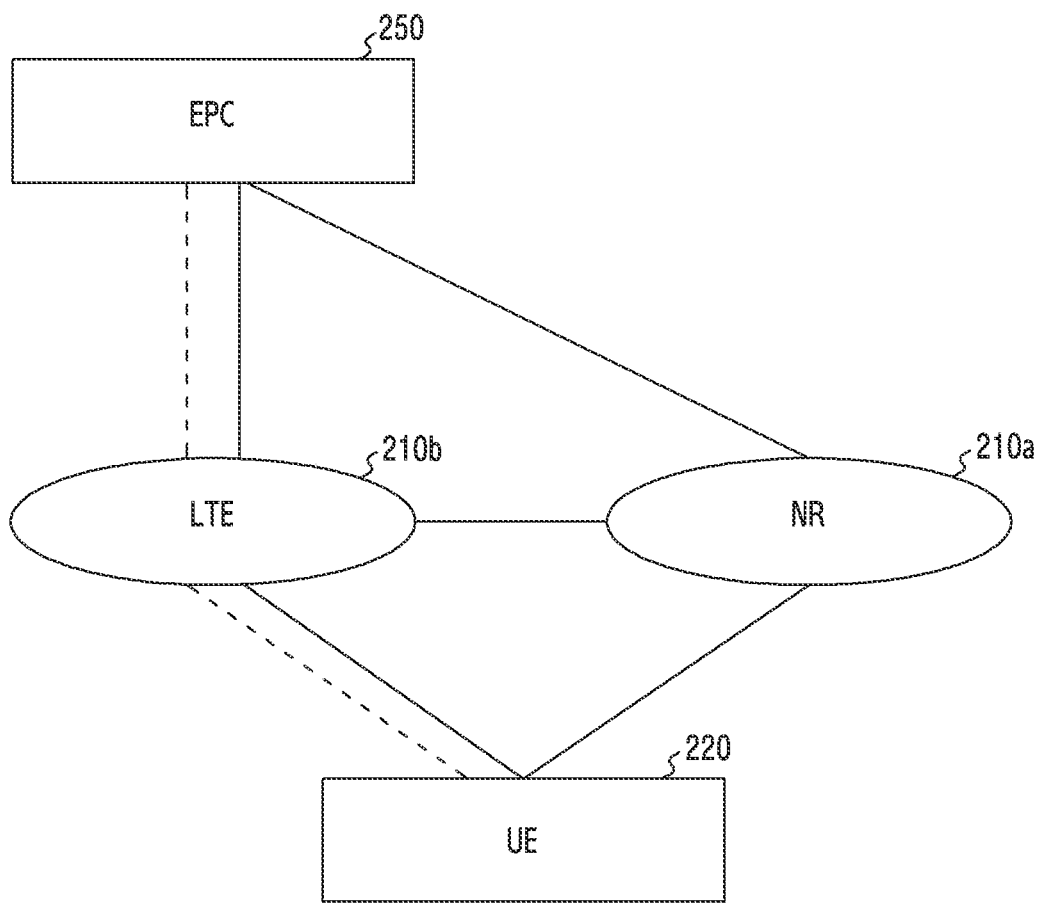
FIG. 2A is a diagram illustrating an example of a 5th generation (5G) non-standalone (NSA) system according to an embodiment of the disclosure.

FIG. 2A is a diagram illustrating an example of a 5G NSA system according to an embodiment of the disclosure.

In an embodiment, referring to FIG. 2A, a 5G NSA system may include an NR RAN 210a, an LTE RAN 210b, a UE 220, and an EPC 250. The NR RAN 210a and the LTE RAN 210b are connected to the EPC 250, and the UE 220 may receive a service from one of the NR RAN 210a and the LTE RAN 210b or may receive a service from both of them in parallel. In another embodiment, the NR RAN 210a may include at least one NR base station, and the LTE RAN 210b may include at least one LTE base station. The NR base station may be referred to as '5$^{th}$ generation node (5G node)', 'next generation nodeB (gNB)', or other terms having technical meaning equivalent thereto. In yet another embodiment, the NR base station may have a structure divided into a central unit and a digital unit. In addition, the CU may have a structure separated into a CU-control plane (CP) unit and a CU-user plane (UP) unit.

In the structure as shown in FIG. 2A, a UE 220 may perform radio resource control (RRC) access via a first base station (e.g., a base station belonging to an LTE RAN 210b) and may be serviced with a function (e.g., connection management, mobility management, and the like) provided in a control plane. In one embodiment, the UE 220 may receive an additional radio resource for performing data transmission or reception via a second base station (e.g., a base station belonging to the NR RAN 210a). In another embodiment, the dual connectivity using LTE and NR may be referred to as evolved universal terrestrial radio access (E-UTRA)—NR dual connectivity (EN-DC). Similarly, dual connectivity in which the first base station uses NR technology and the second base station uses LTE technology is referred to as NR-E-UTRA dual connectivity (NE-DC). In addition, various embodiments may be applied to various other types of multi-connectivity and carrier aggregation technologies. In addition, various embodiments may be applied to a case in which a first system that uses first communication technology and a second system that uses second communication technology are embodied in a single device or may be applied to a case in which the first base station and the second base station are located in the same geographical location.

Figure 2B:
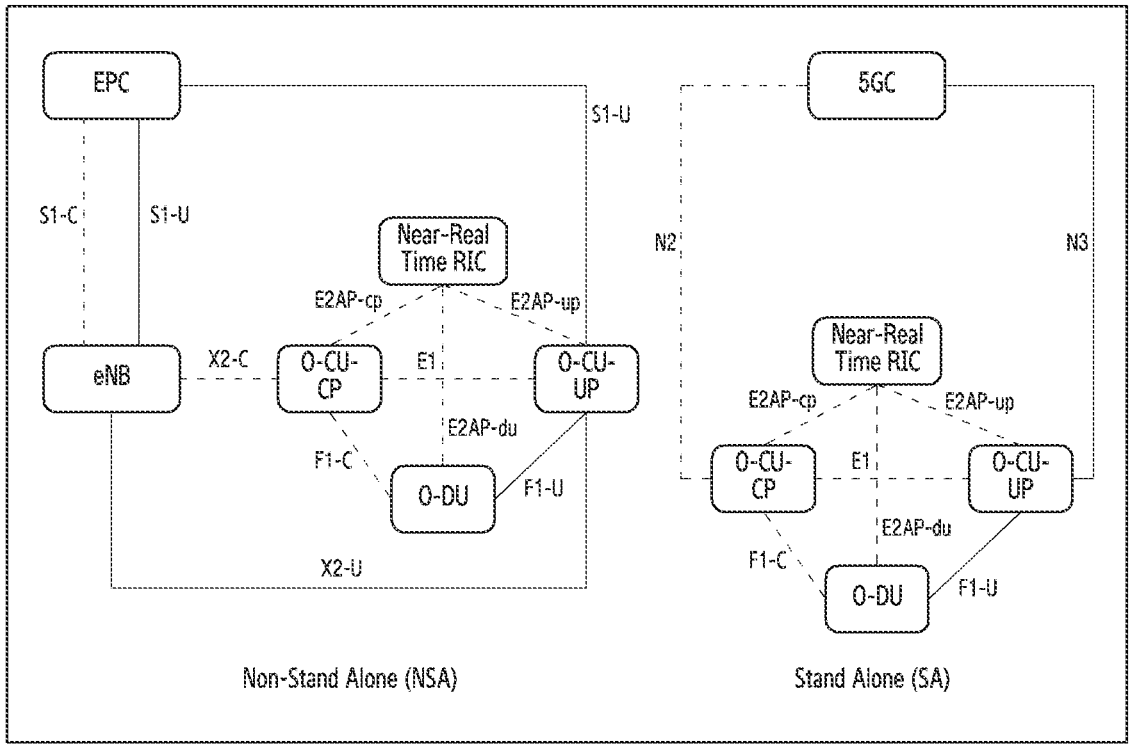
FIG. 2B is a diagram illustrating an example of an architecture of an O-RAN according to an embodiment of the disclosure.

FIG. 2B is a diagram illustrating an example of an architecture of an O-RAN according to an embodiment of the disclosure. In this case, for the purpose of E2-SM-key performance indicator (KPI) monitoring (E2-SM-KPIMON) of an E2 service model, an O-RAN non-standalone mode in a multi-connectivity operation that uses E-UTRA and NR radio access technology is taken into consideration, and an E2 node is assumed to be in the O-RAN standalone mode.

Referring to FIG. 2B, in a deployment of the O-RAN non-standalone mode, an eNB is connected to an EPC via an S1-C/S1-U interface, and is connected to an O-CU-CP via an X2 interface. In an embodiment, an O-CU-CP for a deployment of an O-RAN standalone mode may be connected to a 5G core (5GC) via an N2/N3 interface.

Figure 3:
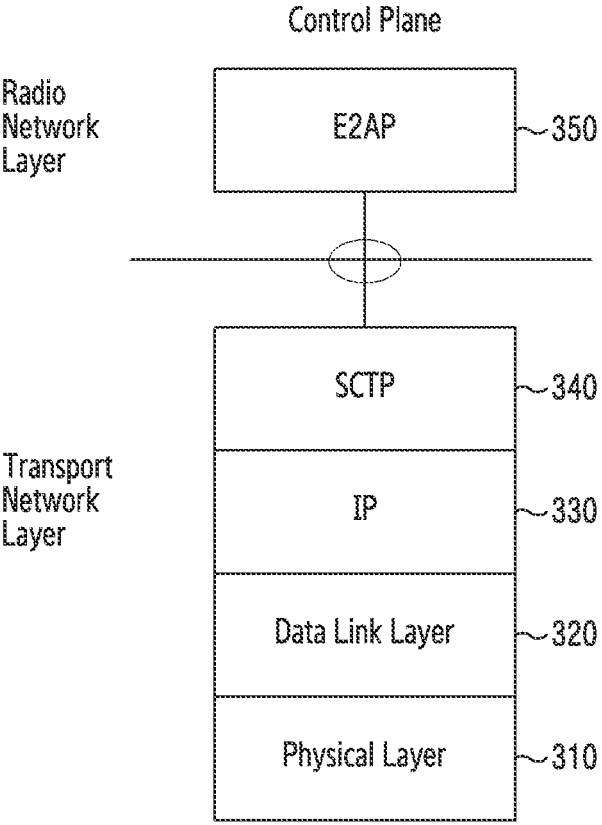
FIG. 3 is a diagram illustrating a protocol stack of an E2 application protocol message in a radio access network according to an embodiment of the disclosure.

FIG. 3 is a diagram illustrating a protocol stack of an E2 application protocol message in a radio access network according to an embodiment of the disclosure.

Referring to FIG. 3, a control plane may, for example, include a transport network layer and a radio network layer. The transport network layer may include a physical layer 310, a data link layer 320, an Internet protocol 330, and a stream control transmission protocol (SCTP) 340.

In an embodiment, the radio network layer may include an E2AP 350. The E2AP 350 may be used for transferring a subscription message, an indication message, a control message, a service update message, and a service query message, and transmission is performed in a higher layer of an SCTP 340 and an IP 330.

Figure 4:
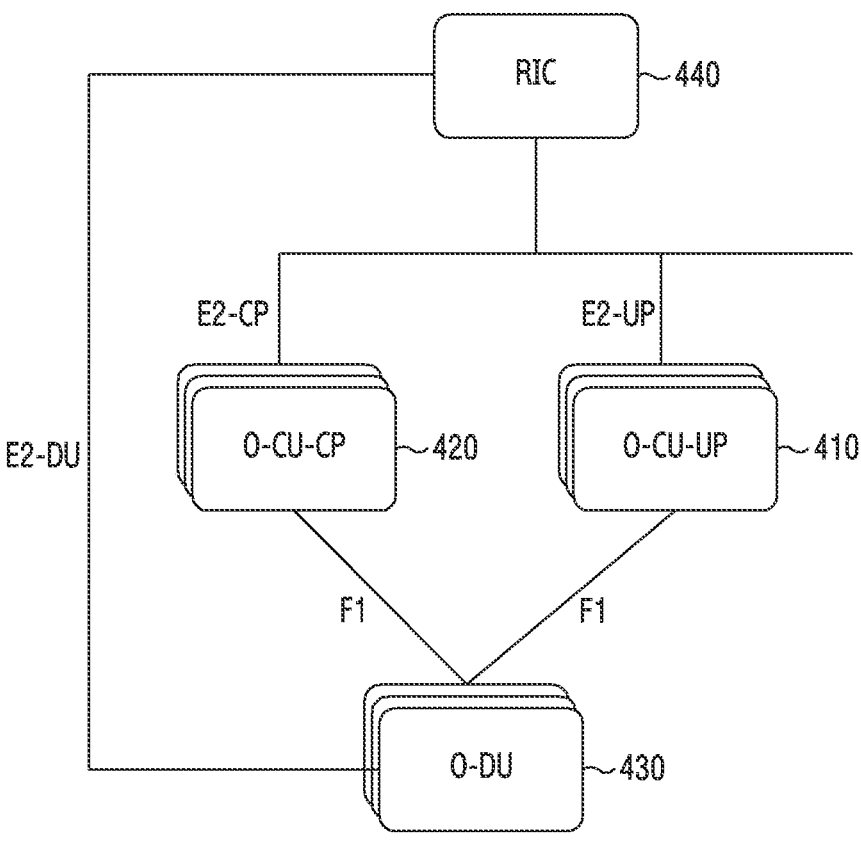
FIG. 4 is a diagram illustrating an example of connection between a base station and a radio access network intelligence controller (RIC) in a radio access network according to an embodiment of the disclosure.

FIG. 4 is a diagram illustrating an example of connection between a base station and a radio access network intelligence controller (RIC) in a radio access network according to an embodiment of the disclosure.

Referring to FIG. 4, an RIC 440 may be connected to an O-CU-CP 420, an O-CU-UP 410, an O-DU 430. An RIC 440 may be a device for customizing an RAN functionality for a regional resource optimization or a new service. According to one embodiment, the RIC 440 may provide functions such as network intelligence (e.g., policy enforcement, handover optimization), resource assurance (e.g., radio-link management, advanced self-organized-network (advanced SON)), resource control (e.g., load balancing or slicing policy), and the like. According to another embodiment, the RIC 440 may perform communication with the O-CU-CP 420, the O-CU-UP 410, and the O-DU 430. The RIC 440 may be connected to respective nodes via an E2-CP interface, an E2-UP interface, and an E2-DU interface. According to yet another embodiment, an interface between the O-CU-CP and the DU and an interface between the O-CU-UP and the DU may be referred to as an F1 interface. Hereinafter, the DU and the O-DU, the CU-CP and the O-CU-CUP, and the CU-UP and the O-CU-UP may be interchangeably used, respectively.

Although FIG. 4 illustrates the single RIC 440 as an example, a plurality of RICs may be present according to various embodiments. A plurality of RICs may, for example, be embodied as a plurality of pieces of hardware located in the same physical location or may be embodied via virtualization using a single piece of hardware.

Figure 5:
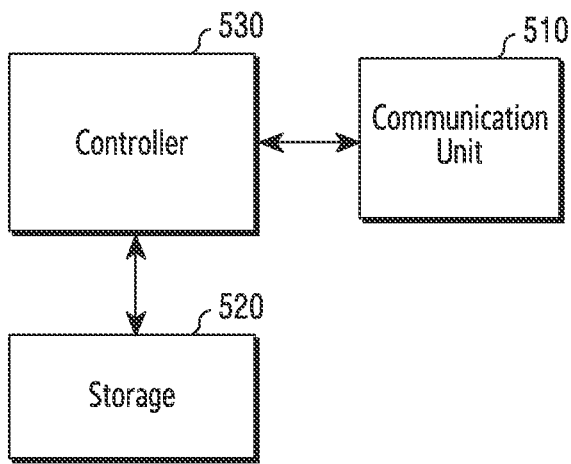
FIG. 5 is a diagram illustrating a configuration of an apparatus in a radio access network according to an embodiment of the disclosure.

FIG. 5 is a diagram illustrating the configuration of an apparatus according to an embodiment of the disclosure. According to one embodiment, the structure illustrated in FIG. 5 may be understood as a configuration of an apparatus having a function of at least one of the RIC, the O-CU-CP, the O-CU-UP, and the O-DU of FIG. 5. The terms 'unit' or 'er' used hereinafter may refer to a unit of processing at least one function or operation and the unit may be embodied as hardware, software, or a combination of hardware and software.

Referring to FIG. 5, a core network device may include a communication unit 510, a storage 520, and a controller 530.

A communication unit 510 provides an interface for performing communication with other nodes in a network. According to another embodiment, the communication unit 510 may convert a bitstream transmitted from the core network device to another device into a physical signal, and may convert a physical signal received from another device into a bitstream. The communication unit 510 may transmit and receive signals. Accordingly, the communication unit 510 may be referred to as a modem, a transmitter, a receiver, or a transceiver. In this example, the communication unit 510 may enable the core network device to communicate with other devices or systems via a backhaul connection (e.g., a wired backhaul or a wireless backhaul) or a network.

A storage 520 may store data, such as a basic program, an application program, configuration information, and the like for operating the core network device. In an embodiment, the storage 520 may be embodied as volatile memory, non-volatile memory, or a combination of volatile memory and non-volatile memory. The storage 520 provides data stored therein in response to a request from the controller 530.

A controller 530 may control the overall operation of the core network device. In an example, the controller 530 may transmit or receive signals via the communication unit 510. In another embodiment, the controller 530 records data in the storage 520, and reads the recorded data. To this end, the controller 530 may include at least one processor. According to some embodiments, the controller 530 may perform control so that the apparatus performs operations according to various embodiments described in the disclosure.

Figure 6:
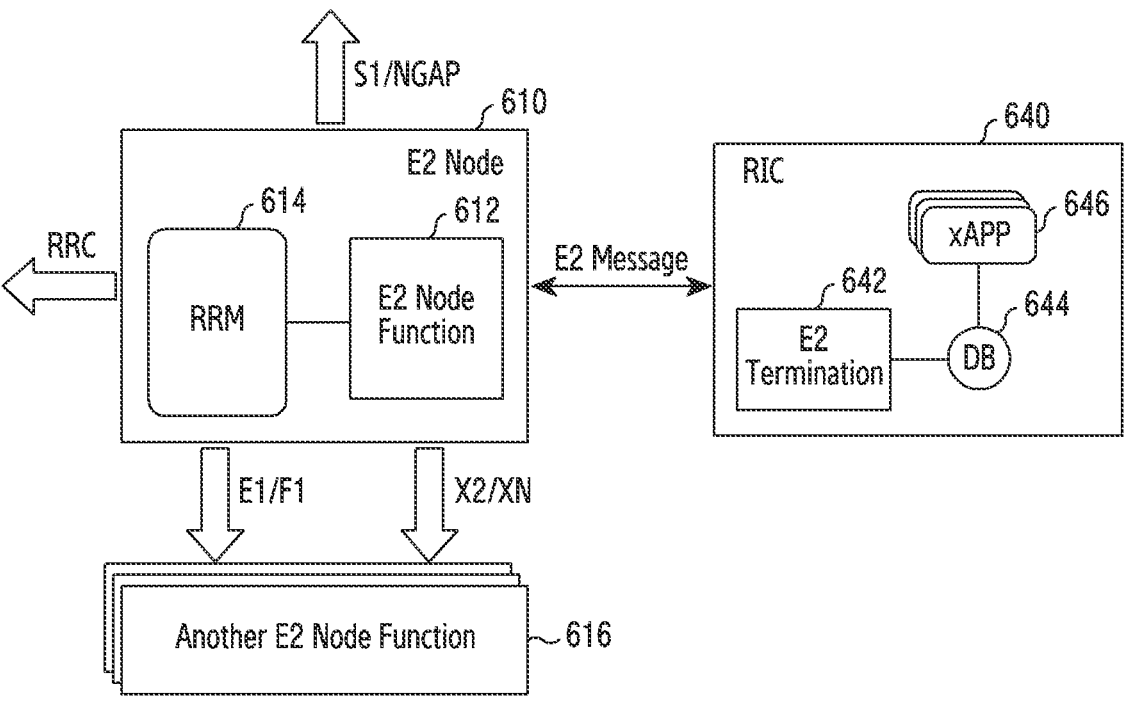
FIG. 6 is a diagram illustrating logical functions related to an E2 message between an E2 node and an RIC in a radio access network according to an embodiment of the disclosure.

FIG. 6 is a diagram illustrating logical functions related to an E2 message between an E2 node and an RIC in a radio access network according to an embodiment of the disclosure.

Referring to FIG. 6, an RIC 640 and an E2 node 610 may mutually transmit or receive an E2 message. For example, the E2 node 610 may be an O-CU-CP, an O-CU-UP, an O-DU, or a base station. In another embodiment, a communication interface of the E2 node may be determined based on the type of the E2 node 610. The E2 node 610 may, for example, perform communication with another E2 node 616 via an E1 interface or an F1 interface. For another example, the E2 node 610 may perform communication with the E2 node 616 via an X2 interface or an XN interface. For yet another example, the E2 node 610 may perform communication via an S1 interface or a next generation application protocol (NGAP) interface (i.e., an interface between a next generation (NG) RAN node and an AMF).

An E2 node 610 may include an E2 node function 612. The E2 node function 612 may be a function corresponding to a predetermined application S/W (xApp) 646 installed in an RIC 640. In an example, in the case of KPI monitoring (monitor), a KPI monitor collection S/W is installed in the RIC 640, and the E2 node 610 may include the E2 node function 612 that produces KPI parameters and transfers an E2 message including the KPI parameters to an E2 termination 642 located in the RIC 640. In one embodiment, the E2 node 610 may include radio resource management (RRM) 614. The E2 node 610 may manage a resource provided to a radio network for a UE.

In another embodiment, the E2 termination 642 located in the RIC 640 is the termination of the RIC 640 for an E2 message and may perform a function of interpreting the E2 message transferred from the E2 node 610 and transferring the same to the xApp 646. In yet another embodiment, a database (DB) 644 located in the RIC 640 may be used for the E2 termination 642 or the xApp 646. The E2 node 610 illustrated in FIG. 6 may be a termination of at least one interface, and may be understood as the termination of messages transferred to a UE, a neighboring base station, and a core network.

Figure 7:
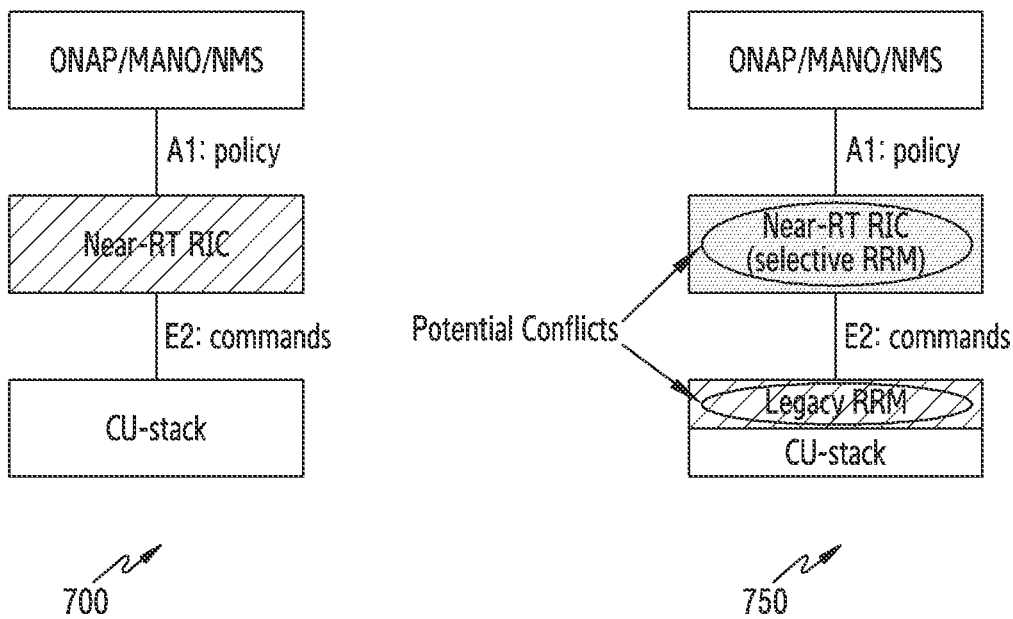
FIG. 7 is a diagram illustrating examples of function split between an E2 node and an RIC according to an embodiment of the disclosure.

FIG. 7 is a diagram illustrating examples of function split between an E2 node and an RIC according to an embodiment of the disclosure. An O-RAN standard may provide function split between an E2 node and an RIC. For example, the E2 node may be a CU. The RIC may be a Near RT RIC. In an embodiment, the RIC may be connected to open network automation platform (ONAP)/management and orchestration (MANO)/network management system (NMS) via an A1 interface. In another embodiment, the RIC may be connected to the E2 node via an E2 interface. In still another embodiment, the E2 interface may transfer commands. Function split options may include function split 700 in which a near-RT RIC manages the entirety of radio resource management (RRM) and function split 750 in which the near-RT RIC selectively manages the RRM.

According to the determination by WG3 in the conference held on Jan. 16, 2019, a Near-RT RIC is to support E2 as an open-type logical interface that aims at building a multi-supplier environment, irrespective of implementation of a predetermined RRC-RRM algorithm located in the nRT-RIC. In the disclosure, an E2 service model radio interface control (E2SM-RIC) may make a pair with an E2SM-NI that is capable of performing injection (inject)/modification (modify)/configuration of a Per UE RRC message for each I/F and network entity (NE). In other words, the Near RT RIC may be gradually enhanced in a direction from the function split 750 to the function split 700. In an example, the E2 may be developed to be an open-type logical interface that is independent from implementation of a predetermined RRC-RRM algorithm in the nRT-RIC and aims at building a multi-supplier environment.

Figure 8:
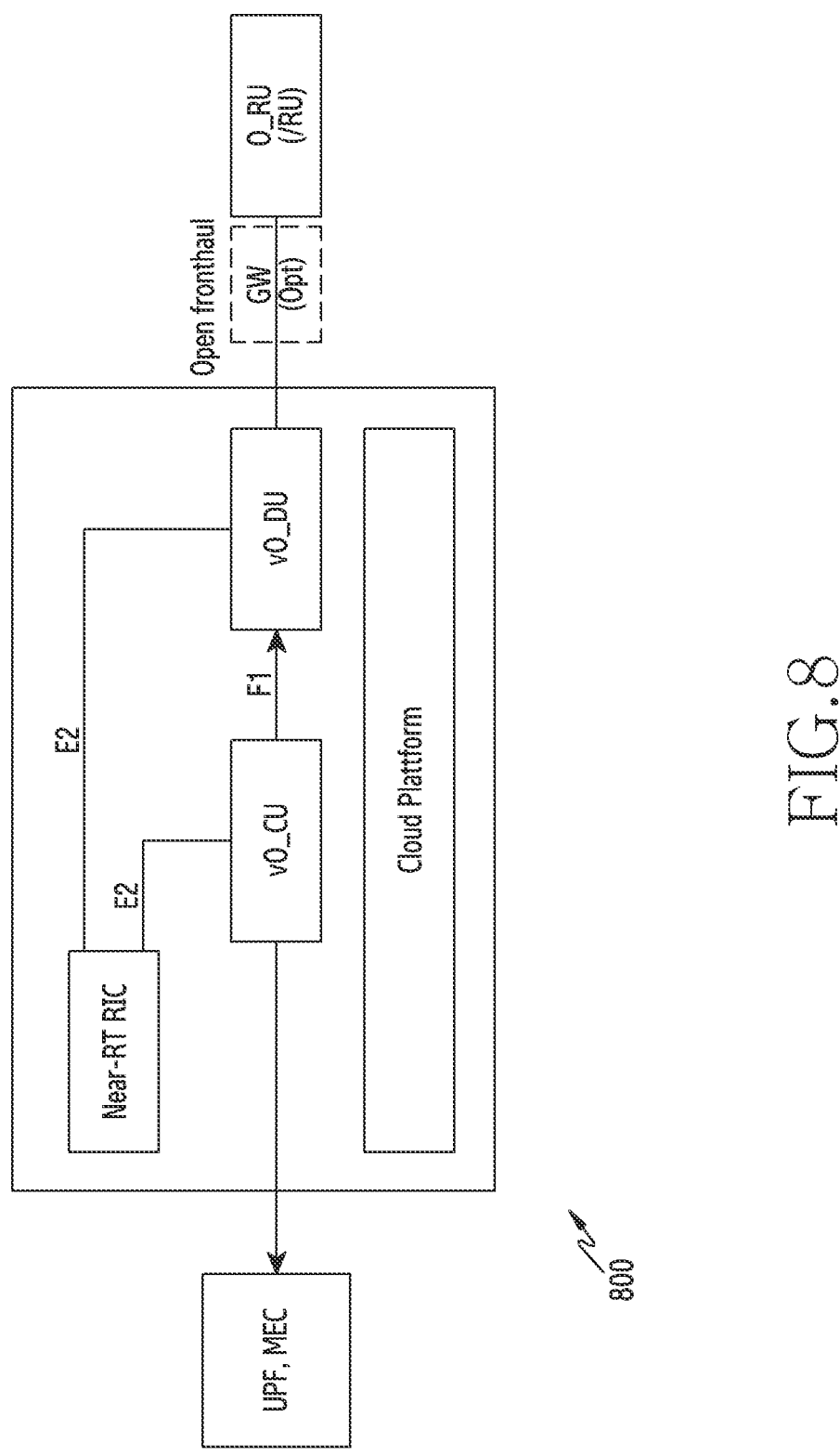
FIG. 8 is a diagram illustrating an example of an embodiment of an E2 node and an RIC according to an embodiment of the disclosure.

FIG. 8 is a diagram illustrating an example of an embodiment of an E2 node and an RIC according to an embodiment of the disclosure.

Referring to FIG. 8, in a scenario of an embodied example 800, an E2 node (e.g., an O-DU, O-CU) and an RIC may, for example, be virtualized in a cloud platform (e.g., an open chassis and blade edge cloud), and may, for example, be configured in an apparatus (e.g., a server). Such a scenario may support distribution in a crowded city area with a plenty fronthaul capacity that allows a BBU function pooled in the central location and with low latency that is low enough to satisfy an O-DU standby time requirement. Therefore, there may be no need to attempt to excessively centralize an RIC, which is close to an RT, more than a limit of centralization of an O-DU function. According to one embodiment, an E2SM-RIC may be optimized to an O-RAN distribution scenario in which a Near-RT RIC, an O-CU, and an O-DU are embodied in an O-Cloud Platform.

Figure 9:
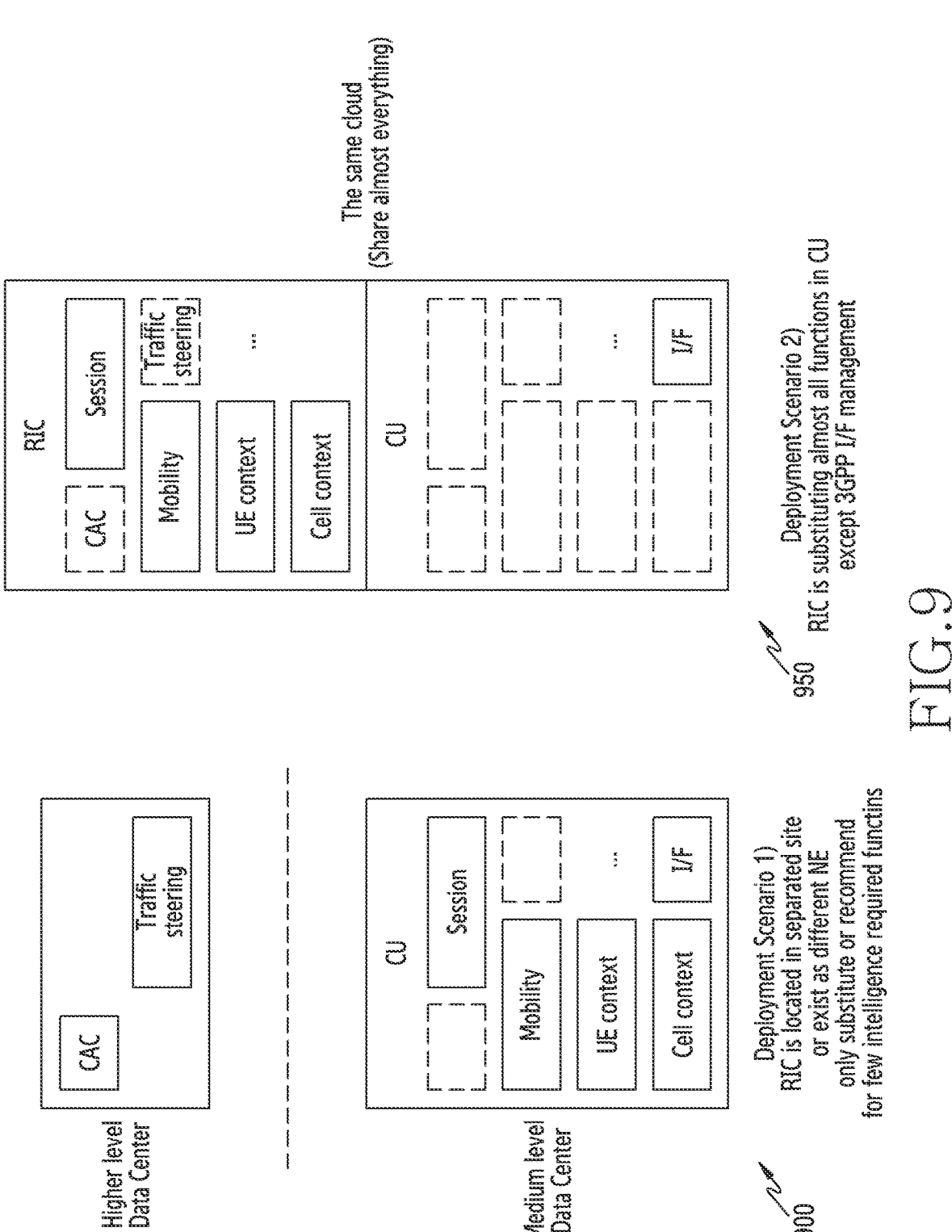
FIG. 9 is a diagram illustrating examples of function split between a centralized unit (CU) and an RIC according to an embodiment of the disclosure.

FIG. 9 is a diagram illustrating examples of function split between a centralized unit (CU) and an RIC according to an embodiment of the disclosure.

Referring to FIG. 9, function split may, for example, be performed according to deployment scenario #1 900 or a function deployment scenario #2 950.

In one example, deployment scenario #1 900: an RIC is merely located in a separate site or present as another NE, and may substitute for a few intelligence-required functions or may be recommended.

In another example, deployment scenario #2 950: An RIC may substitute for almost all functions of a CU, excluding 3GPP I/F management.

Although FIG. 9 illustrates two scenarios, other scenarios may also be applied. In an example, in the deployment scenario #1 900, a mobility function may be performed by an RIC, as opposed to by a CU. In another example, in the deployment scenario #1 900, a UE context function may be performed by an RIC, as opposed to by a CU. In yet another example, in the deployment scenario #1 900, a session configuration function may be performed by an RIC, as opposed to by a CU.

Figure 10:
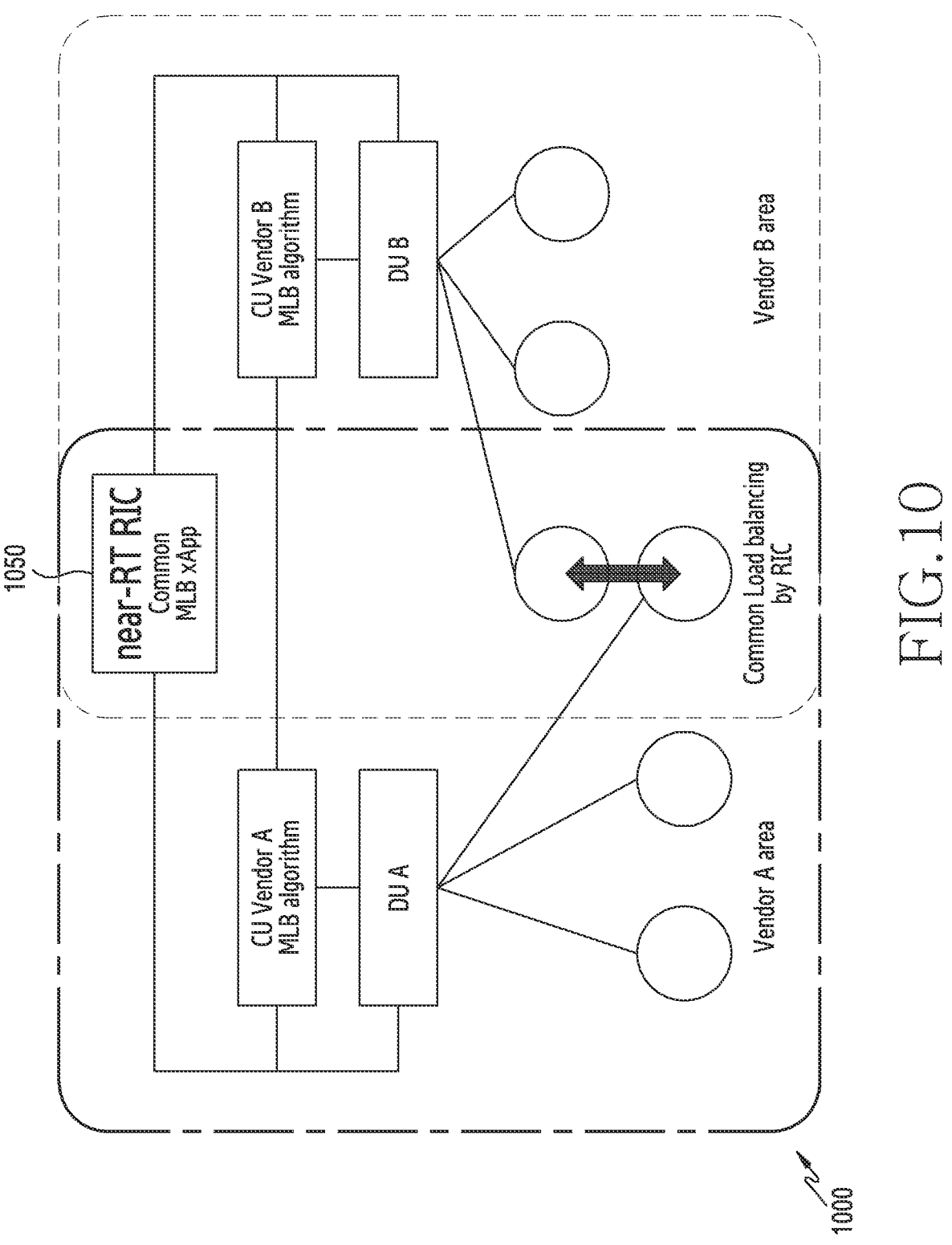
FIG. 10 is a diagram illustrating an example of mobility load balancing (MLB) control for different vendors according to an embodiment of the disclosure.

FIG. 10 is a diagram 1000 illustrating an example of controlling mobility load balancing (MLB) for different vendors according to an embodiment of the disclosure. Such an MLB may be performed by RRM control. A first CU and a first DU may be provided by vendor A. In an embodiment, a second CU and a second DU may be provided by vendor B. In another embodiment, the first DU may provide a service area of the vendor A. RUs connected to the first DU may provide a service area of the vendor A. In still another embodiment, the second DU may provide a service area of the vendor B. RUs connected to the second DU may provide a service area of the vendor B.

When a UE is to move, an optimal cell may be identified via load balancing. In the case that such load balancing is performed by different vendors, it is difficult to smoothly perform load balancing in a space where service areas of the vendors overlap. Vendors are required to perform interworking in an inter vendor zone or an inter CU-CP area. For example, for interworking among vendors, it is required that RRM control is performed in a centralization manner. Therefore, an RIC (for example, a near-RT RIC 1050) according to various embodiments of the disclosure may be configured to perform RRM. In an embodiment, the RIC may not only receive a measurement from each E2 node, but may also produce a message for controlling each E2 node. In another embodiment, the RIC may transmit a control message to each E2 node (e.g., a DU or a CU-CP, CU-UP).

Figure 11A:
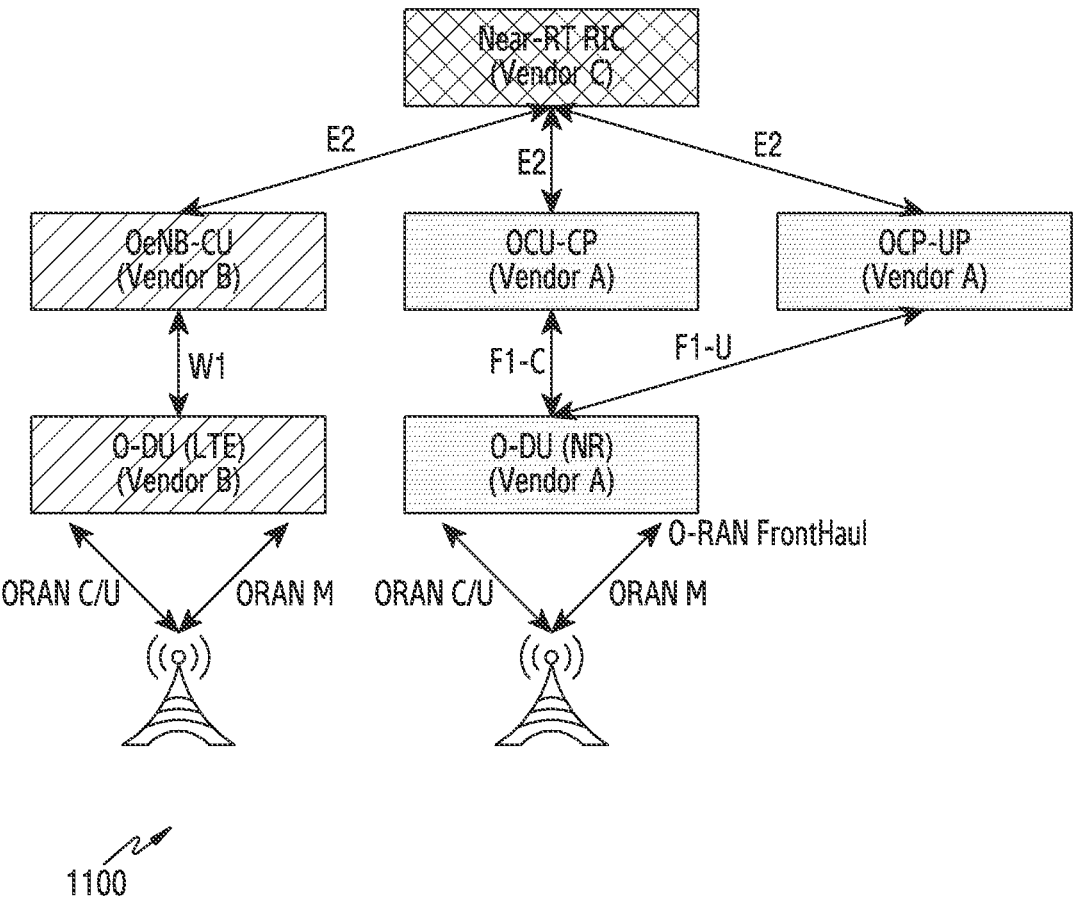
FIG. 11A is a diagram illustrating an example of MLB control for different vendors according to an embodiment of the disclosure.

FIG. 11A is a diagram illustrating an example of MLB control for different vendors according to an embodiment of the disclosure. Unlike the diagram illustrated in FIG. 11A, if a single vendor operates, an RAN context may be identified by a Near-RT RIC. Additionally, trigger event/REPORT, INSERT, POLICY conditions may operate. A control operation (control action) may also operate, and a normal subordinate function defining approach may also operate. As illustrated in FIG. 11A, in the case that multiple vendors operate, an RAN context may not be identified by a Near-RT RIC. In addition, trigger event/REPORT, INSERT, POLICY conditions may not operate. Due to local RRM conflict, a control operation (control action) may not operate or may rely on implementation.

Single E2SM-RAN control may, for example, be difficult to normally operate in a situation of an O-RAN in a multi-vendor environment. This is because, in consideration of all RAN features, there are a function parity and an operation parity. According to one embodiment, the RAN function parity is a difference between features related to RRM functions (e.g., quality of service (QoS) handover, load balancing (LC) handover, or the like). An RAN operation parity is a difference between features related to RAN operations (e.g., EN-DC SCG bearer change procedure). In addition, operations associated with REPORT/INSERT/CONTROL/POLICY may not identify accurate RAN CONTEXT. According to another embodiment, REPORT/INSERT/CONTROL/POLICY operations may not identify trigger events/conditions associated with REPORT/INSERT/POLICY. In addition, it is difficult to make reference to an RAN context in a predetermined disposition in the corresponding operation.

Referring to FIG. 11A, a wireless communication environment 1100 shows network entities configured via a total of three vendors. Vendor A may be an NR supplier. Vender B may be an LTE supplier. Vender C may be an RIC supplier. According to one embodiment, to solve the above-described problems, a single entity capable of managing any case may be required even though an E2 node of any of the vendors is connected. Although vendors are different from each other, the near-RT RIC is capable of collecting all pieces of measurement information of them, and thus the near-RT RIC may easily perform management and control than other entities. When the near-RT RIC performs RRM in a concentration manner, issues of differences and compatibility between vendors may be solved. In addition, even though RATs are different from each other, issues of differences and compatibility between vendors may be solved.

In the disclosure, RRM in a concentration manner by a near-RT RIC may be described by being referred to as RIC-based RRM control, zombie mode of an E2 node, a zombie mode of an E2SM-RIC, an E2SM-RIC dedicated mode, or the like. It is a matter of course that the technical meaning in which an RIC substitutes for the function of each E2 node may substitute for the above-described terms.

Figure 11B:
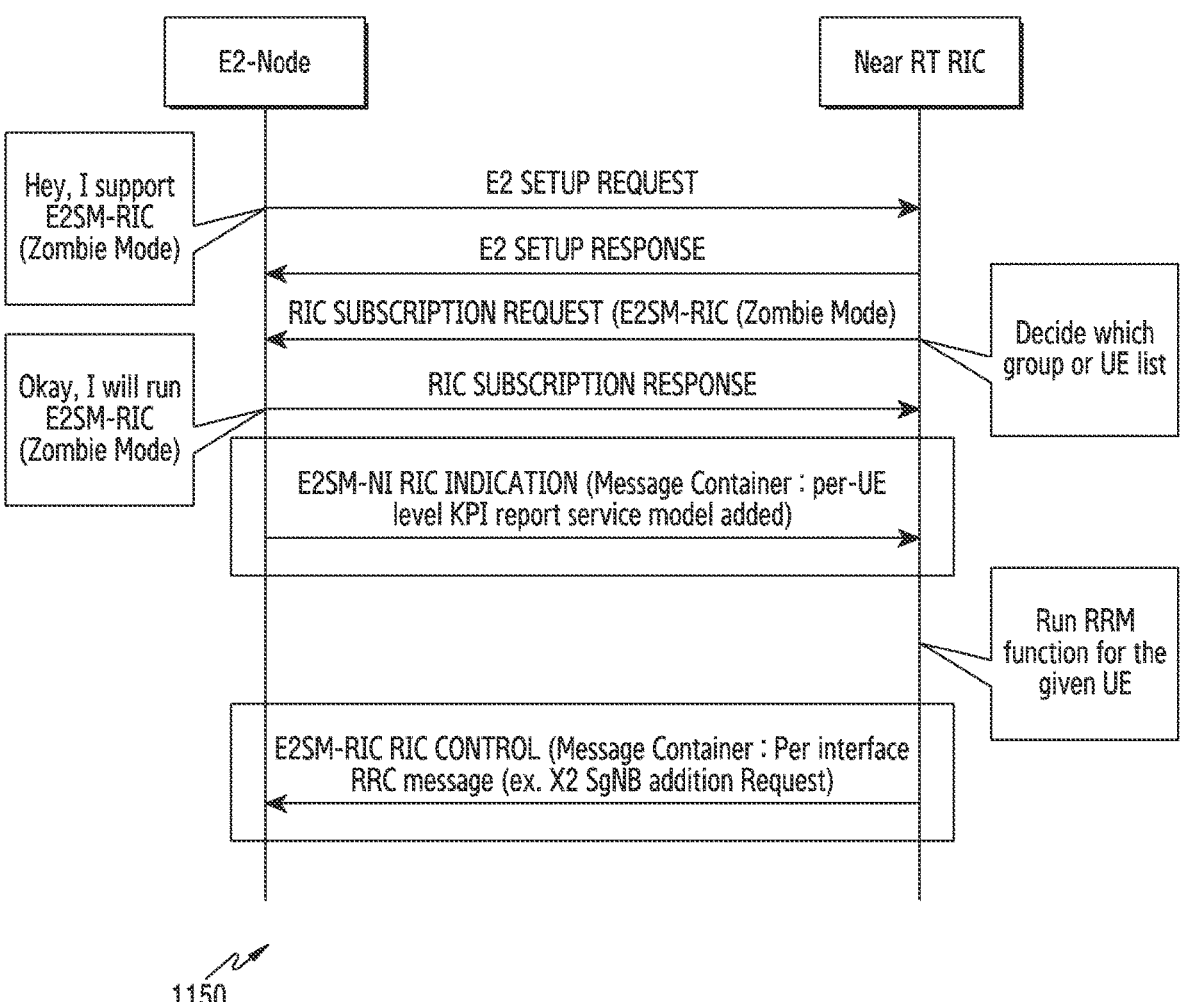
FIG. 11B is a diagram illustrating signaling for configuring radio resource management (RRM) control by a near-RT RIC according to an embodiment of the disclosure.

FIG. 11B is a diagram 1150 illustrating signaling for configuring RRM control by a near-RT RIC according to an embodiment of the disclosure. FIG. 11B is a diagram illustrating an example of a signaling procedure performed between an E2 node and an RIC. Specifically, FIG. 11B illustrates a setup procedure of an E2 I/F between an E2 node and an RIC and an RIC subscription message transfer procedure. FIG. 11B illustrates a procedure of transferring an RIC indication message and an RIC control message.

Referring to FIG. 11B, an E2 node may transmit, to an RIC, an E2 setup request (SET UP REQUEST) message. An E2 NODE FUNCTION located in the E2 node may find out an RIC using an IP address of an RIC configured as operation administration-maintenance (OAM), and may transmit an E2 setup request message. The E2 node may request RIC-based RRM control. For example, the E2 node may transmit, to the RIC, an E2 setup request (SET UP REQUEST) message including the fact that the E2 node is capable of operating in a zombie mode. The RIC may then receive an E2 setup response (E2 SETUP RESPONSE) message from the E2 node. Based on the response from the E2 node, the RIC may determine whether the E2 node supports a zombie mode, in other words, whether the RIC is capable of performing full RRM control.

Referring to FIG. 11B, the RIC may transmit a subscription request (RIC SUBSCRIPTION REQUEST) message to the E2 node. A predetermined xAPP located in the RIC may, for example, request, from an RIC E2 termination function, subscription for a predetermined RAN Function Definition function supported by E2. According to one embodiment, the subscription request message may include information indicating whether the RIC performs RIC-based RRM control. For example, the subscription request message may include information indicating whether the RIC operates as an E2SM-RIC. In another example, the RIC may transmit a subscription request message including a zombie mode indicator. According to another embodiment, the RIC-based RRM control may be performed for each UE or for each UE group including UEs.

As illustrated in FIG. 10 or 11A, the RIC-based RRM control may be performed with respect to a UE located in an inter-vendor zone or a common service area of CU-UPs or a group including the UE. The subscription request message may include an ID (hereinafter, a group identifier) indicating a group or an ID (hereinafter, a UE ID/UE Id) for indicating a predetermined UE.

According to yet another embodiment, as illustrated in FIG. 7, a subscription request message and an E2 setup response message may be transmitted separately. According to still another embodiment, a subscription request message in a step may be included in an E2 SETUP RESPONSE message in the step and transmitted together.

In a subsequent step, the E2 node may transmit a subscription request response (RIC SUBSCRIPTION RESPONSE) to the RIC. In another embodiment, the E2 node function of the E2 node may decode the subscription request message. In yet another embodiment, the E2 node may identify whether the RIC is an E2SM RIC. The E2 node may identify whether the RIC operates in a zombie mode or may identify whether the E2 node operates in a zombie mode.

Referring to FIG. 11B, the E2 node may transmit an E2 RIC indication message to the RIC. In an embodiment, the E2 node and the RIC may perform an RIC indication procedure. According to some embodiments of the disclosure, the RIC indication message may include a KPI report per UE. According to another embodiment, a message container of an RIC indicator message may include a per-UE level KPI report service model. Subsequently, the RIC may perform RRM with respect to the corresponding UE. Although not illustrated in FIG. 11B, the RIC may perform RRM, and may produce a control message including detailed information related to a resource allocation procedure. Through the above, the RIC may control each E2 node. An E2SM RIC control (CONTROL) message may be transmitted to the E2 node 610. The E2 node 610 and the RIC 640 may perform an RIC control procedure. The RIC 640 may produce an E2SM-RIC RIC control message for a E2 node control procedure. In an example, the E2SM-RIC RIC control message may include a message container. In another example, the message container may include an RRC message (e.g., an X2 SgNB addition request message) per interface.

Although FIG. 11B provides descriptions in units of UEs, measurement and reporting thereof and RIC control may, for example, be performed in various units such as UE group/network slice, or the like.

Although FIG. 11B sequentially describes a setup procedure, an RIC subscription procedure, an RIC indication message transmission procedure, and an RIC control message transmission procedure, various embodiments of the disclosure are not limited to the above-described sequence or procedures. According to some embodiments, the E2 node and the RIC may perform an E2 setup procedure, independently. According to other embodiments, the E2 node and the RIC may perform a subscription procedure, independently. According to still another embodiment, as described above, an E2 setup response message may include a subscription request message. According to still other embodiments, the E2 node and the RIC may perform an RIC indication procedure, independently. In addition, according to some embodiments, the E2 node and the RIC may perform an RIC control procedure, independently. Moreover, the E2 node and the RIC may perform at least some of the above-described procedures, together or separately.

Figure 12:
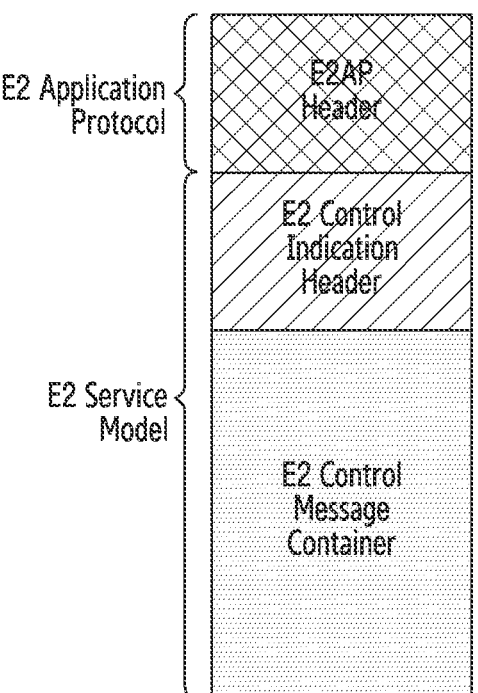
FIG. 12 is a diagram illustrating an example of an E2 control message supported in O-RAN E2 service model used by an E2 service model radio interface control (E2SM-RIC) according to an embodiment of the disclosure.

FIG. 12 is a diagram illustrating an example of an E2 control message (Control Message) supported in O-RAN E2 Service Model used by an E2SM-RIC according to an embodiment of the disclosure. In an embodiment, the E2 Control Message may briefly include E2AP Header and E2 Service Model. In another embodiment, the E2AP Header may specify a message code value indicating that an E2 message is a control message. In yet another embodiment, the E2 control message may be located in the E2 Service Model. The E2 Service Model may include an E2 Control Indication message and an E2 Control Message Container message.

FIG. 13 is a diagram illustrating an example of transferring scheduling information via an E2 control message according to an embodiment of the disclosure. According to one embodiment, the E2 control message may be an RIC control request message that a Near-RT RIC transmits to an E2 node. FIG. 13 illustrates an example of a network interface message container located in a message body indicated by E2SM Control Header supported in O-RAN E2 Service Model used by an E2SM-RIC according to various embodiments of the disclosure. This is an octet string value identical to a network interface message used in an O-RAN. According to another embodiment, a radio control interface may include at least one of 'Radio Control Interface Message Type', 'RAT Type', 'O-RAN UE ID', 'RAN UE Group ID', or 'RIC Control message priority'. 'M' denotes 'mandatory', and 'O' denotes 'optional'. The Radio Control Interface Message Type may define the types of RRC messages transferred between a base station and a UE defined in the 3GPP. In an example, the types of RRC messages may include RRC connection reconfiguration or RRC connection re-establishment. The RAT type denotes the type of radio access technology (RAT), and defines LTE (i.e., E-UTRA) or NR. An O-RAN UE ID may be a C-RNTI managed by a base station or a unique ID of a UE managed by a Near-RT RIC associated with a TMSI, a GUTI, or the like. According to still another embodiment, the RAN UE GROUP ID may be an ID of a service group to which a UE allocated by an access and mobility management function (MME/AMF) belongs. In another example, the RAN UE GROUP ID may include a service profiling identity (SPID) and/or a radio access type/frequency of selection priority (RFSP). The RIC Control Message Priority is a priority order of messages to be processed when a base station receives a radio control interface message for the same UE from a near-RT RIC. According to yet another embodiment, an ID allocated by the E2 node may be used as the ID of FIG. 13. The E2 node may be a gNB, an eNB, an ng-eNB, a gNB-DU/en-gNB-DU, an ng-eNB-DU, or an en-gNB.

In an embodiment, the control message may include a related DRB ID to be used when corresponding control is performed for each DRB in detail. A DRB ID may be an ID of a data radio bearer allocated to a UE. In addition, the control message may include a radio control parameter for controlling a PHY layer related to power control, physical resource block allocation, and MCS allocation. In another embodiment, the radio control parameter may include a parameter related to scheduling. In still another embodiment, the radio control parameter may include at least one of a DL/UL scheduling priority, a DL/UL target BLER, a DL/UL maximum allowable radio resource block size, a DL/UL guaranteed radio resource block size, a DL/UL guaranteed data rate, or a DL/UL power offset.

A Per UE DCI control message container may be defined in order to directly transfer, to a UE, a DCI message according to the LTE standard (TS 36.212) or NR standard (TS 38.212). For example, in the corresponding container, a DCI message format type defined in LTE or NR and a message container for delivering the corresponding message may be included. In another example, in the corresponding DCI control message container, a DCI format type in LTE and/or NR may be defined. In addition, a related DCI may be encapsulated (encapsulation) in a DCI container. Through the above, the RIC may produce, per UE, a DCI message appropriate for each RAT type. The RIC may autonomously produce the same and may perform PHY level control such as power control, resource block (RB) allocation control for each UE, modulation and coding scheme (MCS) configuration, and the like.

In an embodiment, the RIC may provide, to a DU, information related to predicted scheduling (e.g., MCS, RB resource allocation). As an example of an operation, a DU may perform scheduling based on information transferred from the RIC. In another embodiment, the DU may perform scheduling based on information transferred from the RIC and channel information (e.g., channel state information (CSI)) obtained from a UE.

FIG. 13 shows Table 1 below.

TABLE 1

| IE/Group Name | Presence | Range | IE type and reference | Semantics description |
|---|---|---|---|---|
| Radio Control Interface Message Type | M | | | |
| RAT type | M | | | |
| O-RAN UE ID | O | | | |
| DRB ID | O | | | |
| Radio Control Parameter | O | | | |

TABLE 1-continued

| IE/Group Name | Presence | Range | IE type and reference | Semantics description |
|---|---|---|---|---|
| >DL scheduling priority | O | 1 . . . 65535 | Relative scheduling priority for non-GBR bearer per UE | |
| >UL scheduling priority | O | 1 . . . 65535 | Relative scheduling priority for non-GBR bearer per UE | |
| >DL target BLER | O | 1~100%, 0.1%, 0.01%, 0.001%, 0.0001%, 0.00001%, 0.000001% | Target BLER for MCS control per UE | |
| >UL target BLER | O | 1~100%, 0.1%, 0.01%, 0.001%, 0.0001%, 0.00001%, 0.000001% | Target BLER for MCS control per UE | |
| >DL maximum allocable Radio Block | O | 0 . . . 273 | # of maximum allocable radio block per UE or per DRB per UE (if DRB ID exists) | |
| >UL maximum allocable Radio Block | O | 0 . . . 273 | # of maximum allocable radio block per UE | |
| >DL Guaranteed Radio Block | O | 0 . . . 273 | # of guaranteed radio block per UE or per DRB per UE (if DRB ID exists) | |
| >UL Guaranteed Radio Block | O | 0 . . . 273 | # of guaranteed radio block per UE or per DRB per UE (if DRB ID exists) | |
| >DL Guaranteed Data Rate | O | 0 . . . 1000000000 bps | Guaranteed data rate per UE or per DRB per UE (if DRB ID exists) | |
| >UL Guaranteed Data Rate | O | 0 . . . 1000000000 bps | Guaranteed data rate per UE or per DRB per UE (if DRB ID exists) | |
| >DL power offset | O | −30~+30 | DL power offset for power control (in dB) per UE | |
| >UL power offset | O | −30~+30 | DL power offset for power control (in dB) per UE | |
| Per UE DCI control message container | O | | | |
| >DCI type for LTE | O | Format 0, Format 1, Format 1A, Format 1B, Format 1C, Format 1D, Format 2, Format 2A, Format 2B, Format 2C, Format 2D, Format 3, Format 3A, Format 4, Format 5, | DCI message format type defined in TS 36.212 | |

17

TABLE 1-continued

| IE/Group Name | Presence | Range | IE type and reference | Semantics description |
|---|---|---|---|---|
| | | . . . | | |
| >DCI type for NR | O | Format 0_0, Format 0_1, Format 0_2, Format 1_0, Format 1_1, Format 1_2, Format 2_0, Format 2_1, Format 2_2, Format 2_3, Format 2_4, Format 2_6, Format 3_0, Format 3_1, | DCI message format type defined in TS 38.212 | |
| | | . . . | | |
| >DCI Container | O | | Message container | |

The example of utilizing the control message is as follows. The RIC may control UE scheduling via the control message.

According to one embodiment, the RIC may configure a control message in order to control the throughput of a UE. In an example, to control the throughput for a UE in a weak electric field, the RIC may configure a control message to designate an appropriate level of scheduling priority and to allocate a larger number of physical radio resource blocks to the corresponding UE. Through the above, the RIC may induce a high throughput for the corresponding UE.

According to another embodiment, when the quality of a channel is low (e.g., a packet error rate is high) in a UE, retransmission is frequently performed, and thus the RIC may configure a control message to configure a target BLER to be low. Since a relatively low target BLER is indicated via the control message, a resource may be allocated according to a relatively low MCS. According to yet another embodiment, the RIC may induce decrease of an error rate via a control message. The MCS of a resource that is actually allocated to an RU via a DU is decreased in the case that a low target BLER is transferred.

In an embodiment, the RIC may configure scheduling parameters according to a service provided to a UE. For example, scheduling parameters in a control message may be configured to restrict a radio resource block size capable of being maximally allocated for each UE or guarantee at least a predetermined radio resource block size so that a UE reduces the amount of interference applied from another UE or avoids insufficient resource allocation, and may secure an appropriate level of service.

In another embodiment, a method in which the RIC directly calculates and transfers the size of a maximum allocable/guaranteed radio resource block may be available, and a method in which the RIC transfers a guaranteed data rate to a scheduler in a DU and supports the scheduler to directly control a radio resource block size required may also be available. In yet another embodiment, the RIC may transmit a control message including a guaranteed data rate to a scheduler in a DU. Such an operation may also be applicable to a DRB serviced at a non-guaranteed bit rate when the RIC needs. In the case that a service needs to be provided over multiple cells, the control message including the guaranteed data rate may be useful when the RIC performs scheduling in consideration of a data distribution situation and an air situation that the UE goes through for each cell. For example, the RIC may transfer information for providing guidance to a DU so as to distribute throughput in units of guaranteed data rates appropriate for each cell. In the case of scheduling performed in units of cells (or in units of DRBs), the guidance may be useful.

In an embodiment of the disclosure, a method performed by a Near-real time (RT) radio access network (RAN) intelligent controller (RIC) may include an operation of producing an RIC control message and an operation of transmitting the RIC control message to an E2 node, and the RIC control message may include an information element (IE) for indicating a type of radio resource control (RRC) message.

In another embodiment of the disclosure, a method performed by an E2 node may include an operation of receiving a radio access network (RAN) intelligent controller (RIC) control message from a Near-real time (RT) RIC and an operation of applying one or more parameters included in the RIC control message, and the RIC control message may include an information element (IE) indicating a type of radio resource control (RRC) message.

According to yet another embodiment of the disclosure, an apparatus of a Near-real time (RT) radio access network (RAN) intelligent controller (RIC) may include at least one transceiver and at least one processor, the at least one processor may be configured to produce an RIC control message and to transmit the RIC control message to an E2 node, and the RIC control message may include an information element (IE) for indicating a type of radio resource control (RRC) message.

According to still another embodiment of the disclosure, an apparatus of an E2 node may include at least one transceiver and at least one processor, the at least one processor is configured to receive a radio access network (RAN) intelligent controller (RIC) control message from a Near-real time (RT) RIC and to apply one or more parameters included in the RIC control message, and the RIC control message may include an information element (IE) indicating a type of radio resource control (RRC) message.

In one embodiment of the disclosure, the RIC control message may include a user equipment (UE) ID and a radio access technology (RAT) type, the RAT type may indicate one of a plurality of RATs, and the plurality of RATs may include new radio (NR) or long-term evolution (LTE).

In another embodiment of the disclosure, the RIC control message may include information indicating a downlink control information (DCI) format.

In still another embodiment of the disclosure, the DCI format may be one of DCI formats defined in 3GPP technical specification (TS) 36.212 in a case of an LTE system, and the DCI format may be one of DCI formats defined in 3GPP TS 38.212 in a case of an NR system.

In yet an embodiment of the disclosure, the RIC control message may include a downlink control information (DCI) message container including DCI.

The RIC control message may include at least one of a priority for scheduling for each UE in a downlink or a priority for scheduling for each UE in an uplink.

According to an embodiment of the disclosure, the RIC control message may include block error rate (BLER) information related to a modulation coding scheme (MCS).

According to another embodiment of the disclosure, the RIC control message may include offset information related to power control for each UE.

According to yet another embodiment of the disclosure, the type of the RRC message may be one of a plurality of types, and the plurality of types may include RRC reconfiguration or RRC connection re-establishment.

According to still another embodiment of the disclosure, the E2 node may be one of a next generation node B (gNB), a distributed unit (DU), an evolved node B (eNB), a gNB-central unit (CU), an en-gNB, and an ng-eNB.

IPC costs may be decreased according to RRM control by the RIC according to various embodiments of the disclosure. In the case that the DU/CU/RIC are located in the same environment, costs for relaying messages may be reduced. The RIC may solve a problem of reciprocity associated with operation of vendors by performing the overall operation excluding message delivery. In addition, the intelligent function of the RIC may be upgraded to substitute for a predetermined function between the DU and CU-UP.

By utilizing an existing E2SM-KPM, an E2 control message may be defined separately based on an RAN function supportable for each E2 node. However, when multiple vendors are supported, the implementation described in FIGS. 10 and 11A may happen to be restricted. The RIC according to some embodiments of the disclosure may control, by utilizing the existing E2SM-NI and E2SM-KPM, all the O-CU-CP, O-CU-UP, and O-DU by using an RRC E2 control message that relays a control message. When overall control is enabled via the RIC, management may be efficiently performed. Particularly, effective load balancing in a service area where vendors overlap may be obtained.

In an embodiment of the disclosure, operations of each entity have been described by designating an operation mode as a 'zombie mode' in order to describe an operation of an E2 node according to RRM control by the RIC, but embodiments of the disclosure are not limited thereto. Various embodiments of the disclosure may use another name for a mode for substituting for the functions of a CU or a DU, other than the zombie mode.

The methods according to some of the embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be configured to be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

Additionally, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. The singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a Near-real time (RT) radio access network (RAN) intelligent controller (RIC), the method comprising:

generating an RIC control message; and transmitting, to an E2 node, the RIC control message including an identifier (ID) of a user equipment (UE) and information on a scheduling control for the UE, wherein the information on the scheduling control includes information indicating a format type of downlink control information (DCI) and the DCI for the UE, and wherein the DCI is associated with a physical layer level control for the UE.

2. The method of claim 1, wherein the RIC control message includes information indicating a radio access technology (RAT) type, wherein the RAT type indicates one of a plurality of RATs, and wherein the plurality of RATs comprises new radio (NR) or long-term evolution (LTE).

3. The method of claim 1, wherein the RIC control message further includes an ID of a data radio bearer (DRB) and information on a priority for the RIC control message.

4. The method of claim 1, wherein the RIC control message further includes information indicating a type of radio resource control (RRC) message, block error rate (BLER) information related to a modulation coding scheme (MCS), and offset information related to power control for the UE.

5. The method of claim 4, wherein the type of the RRC message is one of a plurality of types, and wherein the plurality of types comprises an RRC reconfiguration or an RRC connection re-establishment.

6. A method performed by an E2 node, the method comprising:

receiving, from a Near-real time (RT) radio access network (RAN) intelligent controller (RIC), an RIC control message including an identifier (ID) of a user equipment (UE) and information on a scheduling control for the UE, wherein the information on the scheduling control includes information indicating a format type of downlink control information (DCI) and the DCI for the UE, and wherein the DCI is associated with a physical layer level control for the UE.

7. The method of claim 6, wherein the RIC control message includes information indicating a radio access technology (RAT) type, wherein the RAT type indicates one of a plurality of RATs, and wherein the plurality of RATs comprises new radio (NR) or long-term evolution (LTE).

8. The method of claim 6, wherein the RIC control message further includes an ID of a data radio bearer (DRB) and information on a priority for the RIC control message.

9. The method of claim 6, wherein the RIC control message further includes information indicating a type of radio resource control (RRC) message, block error rate (BLER) information related to a modulation coding scheme (MCS), and offset information related to power control for the UE, wherein the type of the RRC message is one of a plurality of types, and wherein the plurality of types comprises an RRC reconfiguration or an RRC connection re-establishment.

10. A Near-real time (RT) radio access network (RAN) intelligent controller (RIC) comprising:

a transceiver; and a processor coupled to the transceiver, and configured to:
   generate an RIC control message, and
   transmit, to an E2 node, the RIC control message including an identifier (ID) of a user equipment (UE) and information on a scheduling control for the UE, wherein the information on the scheduling control includes information indicating a format type of downlink control information (DCI) and the DCI for the UE, and wherein the DCI is associated with a physical layer level control for the UE.

11. The RIC of claim 10, wherein the RIC control message includes information indicating a radio access technology (RAT) type, wherein the RAT type indicates one of a plurality of RATs, and wherein the plurality of RATs comprises new radio (NR) or long-term evolution (LTE).

12. The RIC of claim 10, wherein the RIC control message further includes an ID of a data radio bearer (DRB) and information on a priority for the RIC control message.

13. The RIC of claim 12, wherein the RIC control message further includes information indicating a type of radio resource control (RRC) message, block error rate (BLER) information related to a modulation coding scheme (MCS), and offset information related to power control for the UE, wherein the type of the RRC message is one of a plurality of types, and wherein the plurality of types comprises an RRC reconfiguration or an RRC connection re-establishment.

14. An E2 node comprising:

a transceiver; and a processor coupled to the transceiver, and configured to:
   receive, from a Near-real time (RT) radio access network (RAN) intelligent controller (RIC), an RIC control message including an identifier (ID) of a user equipment (UE) and information on a scheduling control for the UE, wherein the information on the scheduling control includes information indicating a format type of downlink control information (DCI) and the DCI for the UE, and wherein the DCI is associated with a physical layer level control for the UE.

15. The E2 node of claim 14, wherein the RIC control message includes information indicating a radio access technology (RAT) type, wherein the RAT type indicates one of a plurality of RATs, and wherein the plurality of RATs comprises new radio (NR) or long-term evolution (LTE).

16. The E2 node of claim 14, wherein the RIC control message further includes an ID of a data radio bearer (DRB) and information on a priority for the RIC control message.

17. The E2 node of claim 14, wherein the RIC control message further includes information indicating a type of radio resource control (RRC) message, block error rate (BLER) information related to a modulation coding scheme (MCS), and offset information related to power control for the UE, wherein the type of the RRC message is one of a plurality of types, and wherein the plurality of types comprises an RRC reconfiguration or an RRC connection re-establishment.

* * * * *